Feb. 13, 1934. A. W. CARGILL 1,947,379
LIME AND MANURE DISTRIBUTOR
Filed Sept. 1, 1932
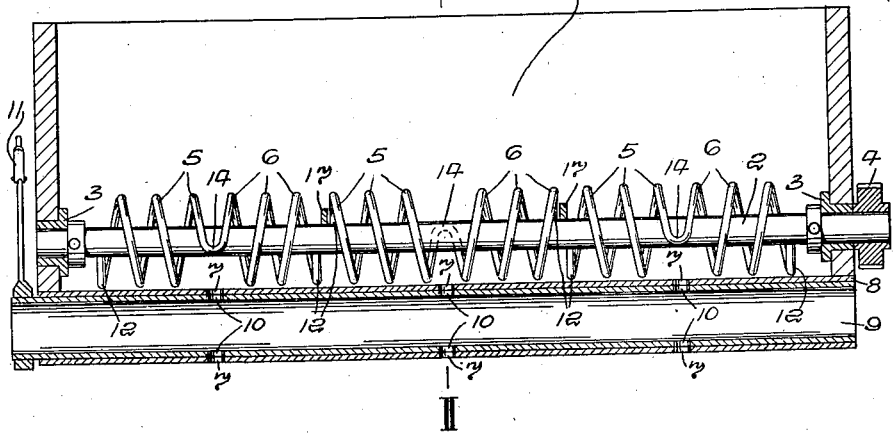
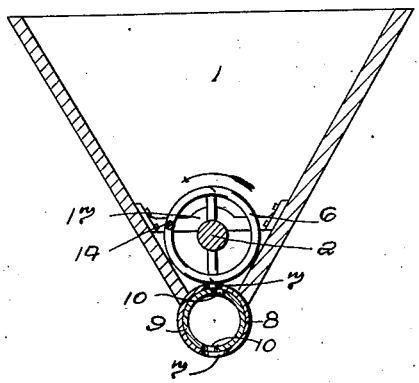
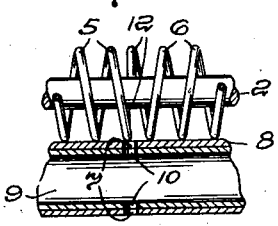
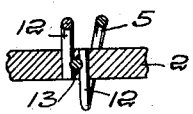
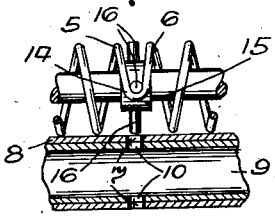
A. W. Cargill, INVENTOR
By Marks & Clark, ATTYS.

Patented Feb. 13, 1934

1,947,379

UNITED STATES PATENT OFFICE 1,947,379

LIME AND MANURE DISTRIBUTOR

Arthur Weir Cargill, Waitawa, New Zealand

Application September 1, 1932, Serial No. 631,415, and in New Zealand September 3, 1931

5 Claims. (Cl. 221—130)

This invention relates to means for distributing lime, chemical manure and such like pulverized materials and is applicable also for dealing with seeds which it is desired to sow with such materials.

It is the object of the invention to provide novel and improved means for conveying the material in the box or hopper to the distributing centres and means for regulating the quantity passed therefrom to the ground.

The invention is adapted to be applied to, or incorporated in, any desired implement or vehicle either power or animal driven, the mechanism being actuated by connection or gearing with a rotating part of such implement or vehicle.

In order that the nature of the invention and its construction may be clearly understood, it will now be fully described and explained with reference to the accompanying drawing, in which:—

Fig. 1 is a longitudinal section through a hopper equipped in accordance with the present invention, Fig. 2 is a cross section of the same along the line 11—11 Fig. 1.

Figs. 3 and 4 show portions of the conveying and distributing means illustrating slight modifications of the arrangement shown in Fig. 1, and, Fig. 5 is a longitudinal section of a portion of the conveying means illustrating a preferred method of assembling the same.

In carrying the invention into effect the construction includes a box or hopper 1 in which the material is adapted to be placed such box being formed with its two longer sides sloping to converge towards the bottom.

The said box may be mounted upon a suitable vehicle such as a dray or lorry either power or animal driven or upon an implement such for example as a plough, roller or drill in which latter case it may take the place of the ordinary manure-hopper, or again such box may be provided with carrying wheels to form a separate implement capable of being drawn by animal or mechanical power.

Arranged within the box 1 to extend longitudinally therewith at the lower part is a spindle 2 rotatably carried in bearings as 3 in the ends of the box, one end of such spindle preferably projecting to the exterior to receive a suitable driving connection such for instance as a cogwheel 4 connecting with a rotating part such for example as one of the carrying wheels, thereby to effect the rotation of the shaft when the vehicle or implement is in motion.

Mounted concentrically upon the spindle 2 to rotate therewith, are a series of right and left handed spirals or helices 5 and 6 respectively of uniform diameter and arranged alternately end-to-end throughout the length of such spindle, each pair of oppositely handed helices 5—6 being adapted when rotated to co-operate in conveying the material to the spaces between the ends of the co-operating helices 5 and 6 of each pair.

In the bottom of the box 1 are outlet openings 7 pitched to be in alignment vertically with the said spaces between the ends of the helices and closely underlying the latter, to receive the material conveyed as above mentioned.

In the preferred form of the invention for the purpose of enabling the outflow of material through the openings 7 to be controlled the said openings are formed through a tube 8 secured in the bottom of the box 1 to extend longitudinally therewith, while disposed axially within the tube 8 is a tube or round rod 9 having through openings 10 arranged to co-incide with the openings 7 of the tube 8.

The said rod or tube 9 is adapted to be angularly displaced within the tube 8 as by means of a hand-lever 11 for the purpose of bringing its openings 10 into and out of register with the openings 7 and thereby adjusting the effective areas of such openings according to requirements.

The said helices 5 and 6 are composed of wire wound to the required formation and having their ends bent to provide radial portions 12 which are received in radial holes in the spindle and in which conditions they are locked by means of pins as 13 (Fig. 5) inserted in radial holes in the spindle at right angles with the aforementioned holes, such pins being partly received in notches in the said radial formations 12.

In a preferred form of the construction also as shown in Fig. 1 each co-operating pair of oppositely handed helices 5 and 6 are made from a single length of wire formed at the junction of the two individual helices with a loop 14 which in the course of each revolution passes across the corresponding opening 7 with a wiping action which serves to urge the material therethrough.

In cases where the rod or tube 9 has been so adjusted to much restrict the effective areas of the outlet openings to permit by a small discharge of the material, it has been found desirable in order to maintain a steady flow, to obtain the above-mentioned wiping action more frequently than once per revolution.

For this purpose as here shown in Fig. 3, co-operating helices of each pair may be made separately and connected to their radial portions 12 to the spindle 2 at points as close as practicable in vertical alignment with the corresponding outlet opening 7 thus causing the outer ends of both of such radial portions 12 to pass in turn across the said outlet at each revolution.

Again as shown in Fig. 4, the said purpose may be served by employing the integral arrangement of the helices as already described and mounting upon the portion of the spindle between such helices a boss 15 having a plurality of radial projections 16 each adapted in the course of the revolution to pass in turn across the outlet 7, one of such arms being adapted to be engaged by the lop 14 in order to cause the boss and its arms to rotate with the spindle and helices.

If thought necessary or desirable also suitable intermediate or steadying bearings as 17 may be provided in the hopper 1 to receive the upper side of the spindle at points between those at which the said pairs of co-operating helices occur.

In practice the outlets 7 may be arranged to deliver the material directly to the ground or to suitable broadcasting means or to coulters such as those of a grain-drill.

In operation the desired material such as lime, chemical manure, or a mixture such for example as fine seeds with a suitable proportion of chemical manure or sand will be placed in the hopper 1 where in the process of being conveyed to the outlets 7 by means of the helices 5 and 6 such material, if of a non-homogeneous nature will become thoroughly mixed thereby causing the material issuing from the outlets to contain approximately constant proportions of the ingredients as desired, while the quantity of material so issuing may be controlled at the will of the operator by adjusting the lever 11 or other means controlling the angular displacement of the tube or rod 8, thereby providing within limits, of any desired weight per acre of land.

I claim:

1. A distributor comprising a hopper having its longitudinal sides arranged in converging relation and connected by a bottom, a rotatable spindle extending longitudinally through the lower part of the hopper, a series of right and left-handed helices mounted alternately end-to-end on said spindle to rotate therewith, said helices being adapted to cooperate in pairs during rotation to convey material to the spaces between the two individual helices of each pair, a tube secured in the bottom of the hopper and extending longitudinally thereof and having outlet openings arranged in line with the spaces between the helices, and an angularly displaceable member disposed axially within said tube and having openings therein movable into registration with the first mentioned openings.

2. A distributor as claimed in claim 1 characterized in that said helices consist of wires having their ends bent to provide radial portions secured in radial openings in the spindle.

3. A distributor as claimed in claim 1 characterized in that the helices of each pair are formed from a single length of wire provided at the junction of the helices with a loop disposed in vertical alinement with the corresponding outlet openings of the tube.

4. A distributor as claimed in claim 1 characterized in that the helices of each pair are made from a single length of wire formed at the junction of the helices with a loop, a member mounted on the spindle at the junction of the helices having a plurality of arms, one of said arms being engaged in said loop and the several arms moving across the outlet opening during rotation of the spindle.

5. A distributor as claimed in claim 1 characterized by the provision of bearings rotatably supporting the spindle at the ends of the hopper and means intermediate the ends of the hopper receiving the upper portion of the spindle at points between the helices of adjacent pairs.

ARTHUR WEIR CARGILL.